UNITED STATES PATENT OFFICE.

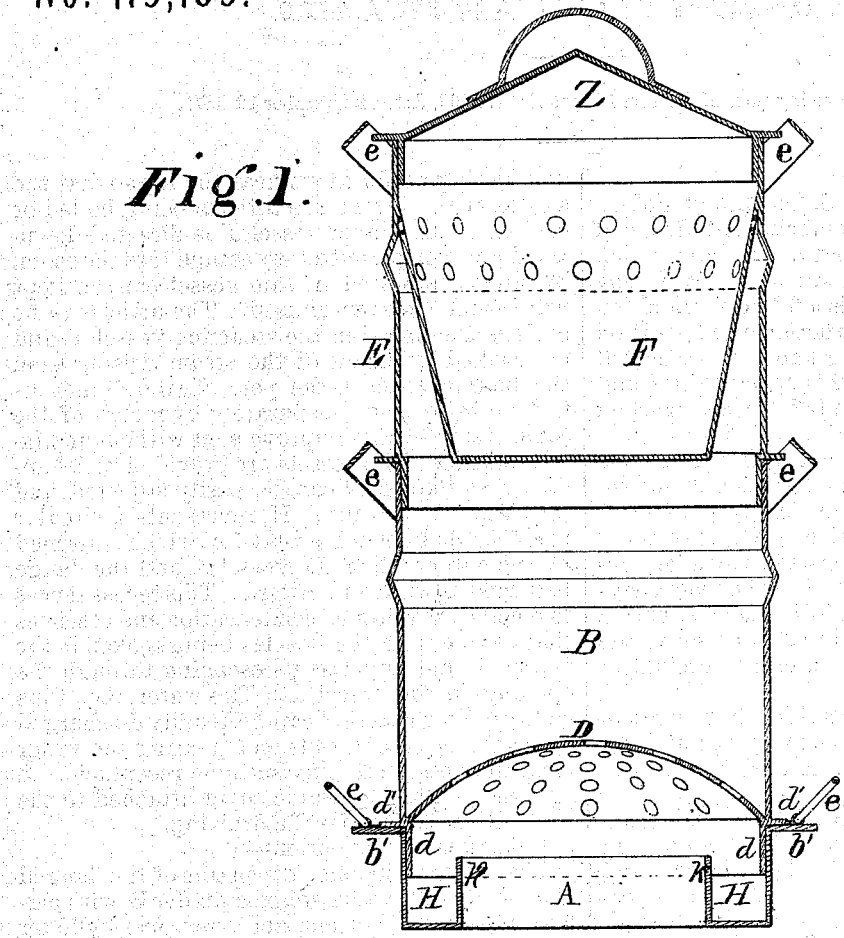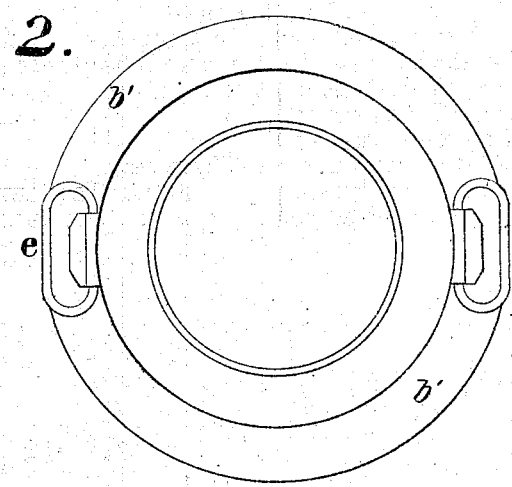

JOHN S. OGDEN, OF JOHNSTOWN, PENNSYLVANIA.

IMPROVEMENT IN CULINARY-STEAMERS.

Specification forming part of Letters Patent No. 119,169, dated September 19, 1871.

*To all whom it may concern:*

Be it known that I, JOHN S. OGDEN, of Johnstown, in the county of Cambria and State of Pennsylvania, have invented a new and valuable Improvement in Steamers; and I do hereby declare that the following is a full, clear, and exact description of the construction and operation of the same, reference being had to the annexed drawing making a part of this specification, and to the letters and figures of reference marked thereon.

Figure 1 of the drawing is a representation of a central vertical longitudinal section of my invention. Fig. 2 is a top view of my steamer.

This invention has relation to improvements in culinary vessels; and consists in the novel construction and arrangement of two or more vessels, placed on top of one another, closed with a tight-fitting cover, and adapted to be set in the opening of a pot of boiling water, as hereinafter described.

In order to enable others skilled in the art to which my invention appertains to make and use the same, I will now proceed to describe its construction and operation.

In the accompanying drawing, A represents the lower vessel arranged to sit in the opening of a pot, the latter being filled with water and placed on a stove for boiling. This vessel is provided with a flange, $b'$, which supports the vessel A in the mouth of the boiler. B represents a steaming-vessel provided with a concave bottom, D, perforated with a number of holes for the passage of the steam. This steaming-vessel B is supported in and upon the channel-vessel A by means of the circular flanges $d\ d'$, as shown on the drawing in Fig. 1. E represents a deep cylinder placed over the vessel B, as shown on the drawing. This cylinder has an inner vessel, F, rigidly secured within it at its upper edge, and having perforations near the top so that the steam arising from the articles being boiled or cooked in the inner vessel F is directed downward and not permitted to escape into the room. Whatever is placed in said vessel can be kept warm and moist until used. The articles to be cooked are placed in the steaming-vessel B and are cooked by means of the steam arising from the boiling water in the pot. Two different articles can be cooked separately by means of the same steam by this improvement without any inconvenience. The vessels are provided with handles $e$, so that they can be easily adjusted and removed at pleasure. H represents a circular recess or channel in the vessel A, which is formed by the outer wall of the vessel A and the flange K turned upward and inward. This recess serves to receive the water of condensation and essences that escape from the articles being cooked in the vessel B, and prevents its escaping through the opening in the vessel A. The water, &c., thus collected in the recess can be readily discharged by removing the vessels and pouring the water from the vessel into any suitable receptacle. Z represents the removable cover attached to the vessel E, as shown on the drawing.

I claim as my invention—

The culinary-steamer, consisting of the flanged channel-vessel A, the steam-cylinder B, with perforated concave bottom, and the upper cylinder E with flaring perforated pan F, substantially as specified.

In testimony that I claim the above I have hereunto subscribed my names in the presence of two witnesses.

JOHN S. OGDEN.

Witnesses:
 JACOB BRALLIER,
 J. R. CALDWELL. (51.)